US010754040B2

(12) United States Patent
Eastman

(10) Patent No.: US 10,754,040 B2
(45) Date of Patent: Aug. 25, 2020

(54) SYSTEM AND METHOD FOR GRAPH ENCODING OF PHYSICAL ACTIVITY DATA

(71) Applicant: Under Armour, Inc., Baltimore, MD (US)

(72) Inventor: Kyler Maxwell Eastman, Austin, TX (US)

(73) Assignee: Under Armour, Inc., Baltimore, MD (US)

( * ) Notice: Subject to any disclaimer, the term of this patent is extended or adjusted under 35 U.S.C. 154(b) by 83 days.

(21) Appl. No.: 16/041,307

(22) Filed: Jul. 20, 2018

(65) Prior Publication Data
US 2018/0335522 A1 Nov. 22, 2018

Related U.S. Application Data

(62) Division of application No. 14/657,947, filed on Mar. 13, 2015, now Pat. No. 10,048,383.

(60) Provisional application No. 61/953,541, filed on Mar. 14, 2014.

(51) Int. Cl.
G01S 1/00 (2006.01)
G01S 1/24 (2006.01)
G01S 19/19 (2010.01)
G01S 19/42 (2010.01)
G01C 21/20 (2006.01)
G06F 7/00 (2006.01)

(52) U.S. Cl.
CPC .............. G01S 19/19 (2013.01); G01C 21/20 (2013.01); G01S 19/42 (2013.01)

(58) Field of Classification Search
CPC ......... G01S 19/19; G01S 19/42; G01C 21/20; G06F 17/30

USPC .................. 701/482; 707/769, 724
See application file for complete search history.

(56) References Cited

U.S. PATENT DOCUMENTS

| | | | |
|---|---|---|---|
| 6,385,539 B1 | 5/2002 | Wilson | |
| 2005/0288836 A1 | 12/2005 | Glass | |
| 2011/0087715 A1 | 4/2011 | Martens | |
| 2011/0276565 A1* | 11/2011 | Zheng | G01C 21/20 707/724 |
| 2012/0158286 A1 | 6/2012 | Nowak | |
| 2012/0254226 A1* | 10/2012 | Shaw | G06F 16/29 707/769 |
| 2013/0304349 A1 | 11/2013 | Davidson | |
| 2014/0095062 A1 | 4/2014 | Wang | |
| 2014/0244154 A1 | 8/2014 | Modica | |

* cited by examiner

Primary Examiner — Mahmoud S Ismail
(74) Attorney, Agent, or Firm — Maginot, Moore & Beck LLP

(57) ABSTRACT

A method for determining properties associated with a graph is disclosed herein. The graph includes a plurality of nodes and a plurality of connections between the nodes. The method comprises receiving global positioning system (GPS) data points for a plurality of GPS tracks associated with the graph. The method further comprises mapping the GPS data points for each of the plurality of the GPS tracks to the graph by determining an activity track based on the GPS track, the activity track including a plurality of nodes from the graph and at least one connection between the nodes. Additionally, the method comprises creating a path matrix including a plurality of values, each value in the path matrix associated with (i) one of the plurality of connections between nodes of the graph and (ii) one of the determined activity tracks.

18 Claims, 9 Drawing Sheets

|              | ACTIVITY 1 | ACTIVITY 2 | ACTIVITY 3 |
|--------------|------------|------------|------------|
| EDGE 1 (1,2) | 2          | -          | -          |
| EDGE 2 (2,3) | 1          | 1          | 2          |
| EDGE 3 (2,4) | -          | 1          | 1          |
| EDGE 4 (4,5) | 2          | 1          | -          |
| EDGE 5 (5,6) | -          | 2          | 1          |

|        | NODE 1 | NODE 2 | NODE 3 | NODE 4 | NODE 5 | NODE 6 |
|--------|--------|--------|--------|--------|--------|--------|
| NODE 1 | -      | -      | -      | -      | -      | -      |
| NODE 2 | -      | -      | -      | -      | -      | -      |
| NODE 3 | -      | -      | -      | -      | 1      | -      |
| NODE 4 | -      | -      | -      | -      | -      | -      |
| NODE 5 | -      | 1      | -      | -      | -      | -      |
| NODE 6 | -      | -      | -      | -      | -      | -      |

SYSTEM AND METHOD FOR GRAPH ENCODING OF PHYSICAL ACTIVITY DATA

CROSS-REFERENCE TO RELATED APPLICATIONS

This application is a division of U.S. patent application Ser. No. 14/657,947, filed Mar. 13, 2015, which claims priority from provisional patent application Ser. No. 61/953,541, filed Mar. 14, 2014, the entire contents of which are incorporated herein by reference.

FIELD

This document relates to the field of activity tracking systems, and particularly to the analysis of existing graphs and activity associated with such graphs.

BACKGROUND

Runners, cyclists and other athletes are increasingly using online tools to track fitness. Some online tools provide routes so that an athlete may select a route and record his or her performance for the route. In some cases, an individual athlete may define a route for personal use or for sharing. This can allow the athlete to track performance gains or losses over time for the same route.

Some athletes find it motivating to use the same route as others and compare results. This can be a relatively straightforward task if athletes explicitly select predefined routes for workouts (e.g., by indicating to an online tool that fitness data was collected on a previously defined "Route 1").

However, unless athletes associate their fitness data with defined routes (e.g., by selecting the defined route for which fitness data is collected) it can be difficult to map multiple athletes' GPS data onto known locations of routes, such as streets, paths or trails so that fitness activity at various locations can be analyzed.

Accordingly, it would be advantageous to provide an activity tracking system that allows athletes associate their fitness data with defined routes and maps GPS data from various activities onto known locations of routes, such as streets, paths or trails. It would also be advantageous if the activity tracking system were configured to analyze the collected data from the various activities and provide insight concerning use of the routes, including metrics on commonly used portions of the routes and metrics on usage of the route by various people groups such as women, men, runners, bikers, etc. It would be additionally advantageous if the activity tracking system were configured to analyze the collected data and automatically identify previously unknown sections or connecting paths within the route.

SUMMARY

Embodiments disclosed herein describe a system for collecting GPS data and mapping large amounts of GPS time-series tracks of user fitness activity onto known locations of routes, which can be streets, paths, or trails. By encoding fitness activity as a series of paths along a network of nodes and edges (or connections) between nodes, the amount of data needed to represent each track can be greatly reduced, allowing quick and simpler computations. Furthermore, graph theory processes can be applied to determine a variety of useful parameters for potential paths. Tracks between nodes can be analyzed to determine actual paths on the routes and determine statistical information for the aggregate of fitness paths. This allows the ability to perform computations on fitness data to obtain relevant information both for users of the fitness tracking service, but also for organizations that need to make specific queries across particular demographics, and particular locations.

In at least one embodiment, a set of GPS time series tracks is created from individual users traversing various paths within a system of trails. A graph representation of routes, consisting of nodes and edges is created and the GPS time series data applied to the graph to create a sparse matrix representation of the routes and edges traversed during an activity. In some cases, suggestions of additional paths to 'grow' the graph can be determined.

Storing GPS data in an accessible way can be cumbersome for a variety of reasons. Values of latitude and longitude need to be stored with high amounts of precision to allow incremental metrics of speed to be computed. Furthermore, it is typically produced by mobile phones and watches at a rate of about 1 Hz (once a second), which means that a typical half-hour run will produce 3600 (1800 for both latitude and longitude) floating-point numbers of very high precision, often with additional timestamps. Graph encoding may be used to encode the same run with less than 30 timestamps (or other number depending on the activity track traversed by the user), each for crossing a particular edge. This can leads to a 100× reduction in storage requirements in some cases.

In addition to reducing data, graph encoding also allows a large variety of questions to be answered directly from a single construct. As described in further detail below, if this construct is a sparse matrix, where every row represents an enumerated edge over a graph of a particular area (such as a city), and every column represents an activity track over a period of time (such as a year), and every nonzero element is simply the sequence of edges, then any aggregate statistics of either activities or route segments (represented by edges) can be performed by single operations of matrix algebra.

With graph encoding, operations shown by Graph Theory may be used on any metric generated by the fitness activity to produce optimized paths between particular nodes. For example, a cyclist may use graph theoretic operations to find the shortest route available to work, or a runner may find the most popular routes to run at night for safety reasons. Graph theoretic operations, such as bounded relaxation, also allow incremental improvement of existing paths, allowing suggestions for existing routes to be improved in a variety of ways, such as the determination of new nodes and new edges between nodes.

In accordance with at least one exemplary embodiment of the disclosure, there is provided a method for determining properties associated with a graph. The method comprises receiving global positioning system (GPS) data points for a plurality of GPS tracks associated with the graph. The method further comprises mapping the GPS data points for each of the plurality of the GPS tracks to the graph by determining an activity track based on the GPS track, the activity track including a plurality of nodes from the graph and at least one connection between the nodes. Additionally, the method comprises creating a path matrix including a plurality of values, each value in the path matrix associated with (i) one of the plurality of connections between nodes of the graph and (ii) one of the determined activity tracks.

Pursuant to another exemplary embodiment of the disclosure, there is provided a method for identifying an edge of a graph associated with selected demographic data from a user database, and a non-transitory computer readable medium containing instructions for performing such method. The method comprises defining the graph within a bounded polygon, the graph including a plurality of nodes and a plurality of connections between the nodes. The method further comprises receiving global positioning system (GPS) data points for a plurality of GPS tracks from a plurality of GPS-enabled devices, and mapping the GPS data points for each of the plurality of the GPS tracks to the graph by determining an activity track based on the GPS track, the activity track including a plurality of nodes from the graph and at least one connection between the nodes. Additionally, the method comprises creating a path matrix including a plurality of values, each value in the path matrix associated with (i) one of the plurality of connections between nodes of the graph and (ii) one of the determined activity tracks. The method further comprises defining a user profile vector based at least in part on the selected demographic data in the user database, multiplying the path matrix and the user profile vector to obtain a resulting vector, and determining at least one edge of the graph associated with selected demographic based on the resulting vector.

The above described features and advantages, as well as others, will become more readily apparent to those of ordinary skill in the art by reference to the following detailed description and accompanying drawings. While it would be desirable to provide an activity tracking system that provides one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein:

FIG. 3 illustrates an exemplary embodiment of a path matrix defined by the nodes of the graph of FIG. 2 and a number of activity tracks defined by GPS tracks;

FIG. 4 illustrates an exemplary embodiment of a suggestion box based on data from an activity track not included in the path matrix of FIG. 3;

DESCRIPTION

Activity Tracking System

Figure 1:
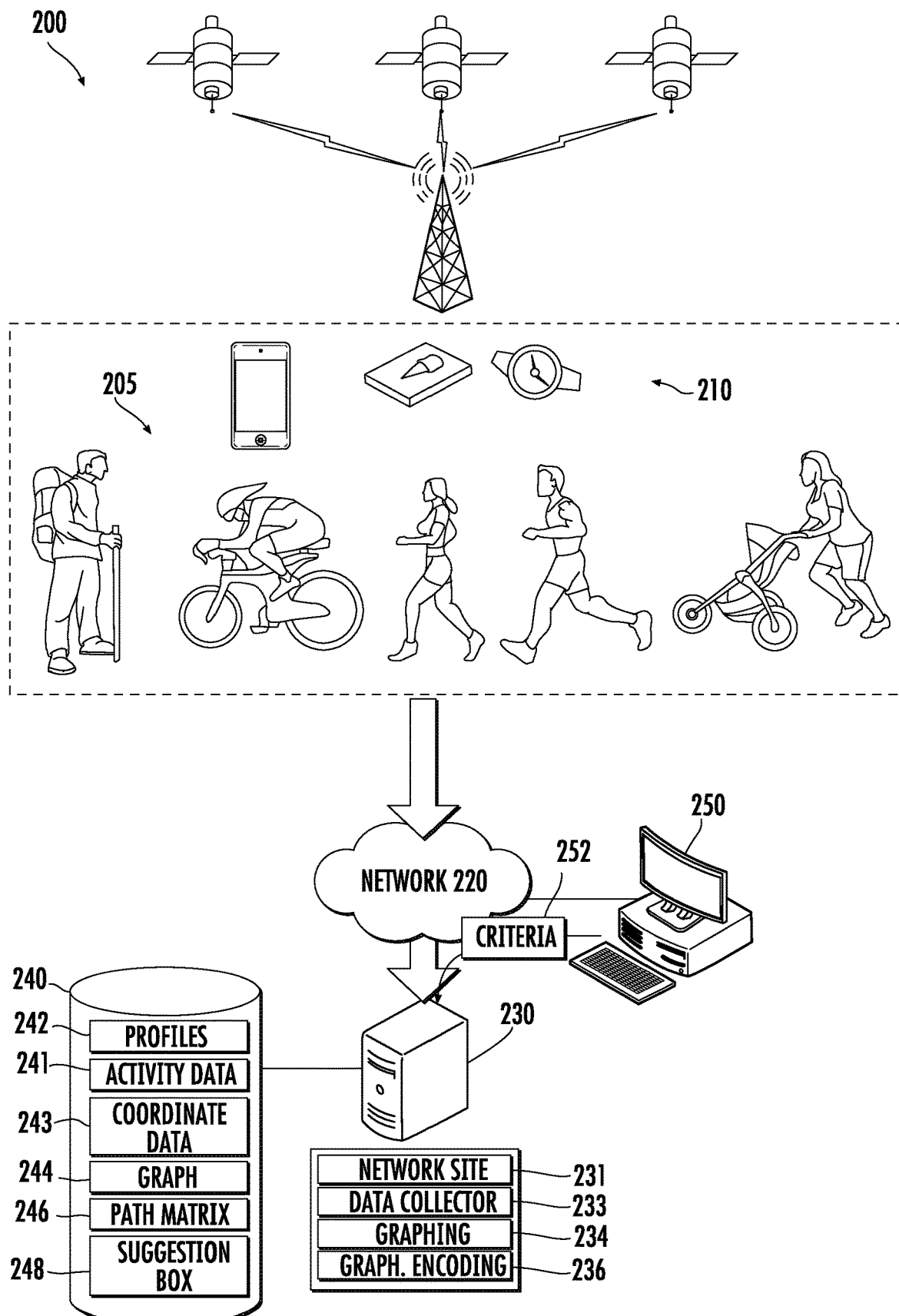
FIG. 1 is a diagram illustrating at least one embodiment of an activity tracking system.

With reference now to FIG. 1, a diagrammatic representation of one exemplary embodiment of an activity tracking system 200 is shown. The activity tracking system includes GPS-enabled devices 210 configured for receiving GPS data from the Global Positioning System satellites, sensing and collecting activity data associated with user 205, and sending the GPS data and the collected sensor data to the server 230 over network 220 (e.g., the Internet, cellular network, LAN or other network). Examples of GPS-enabled devices 210 include devices configured with GPS receivers such as smartphones, GPS watches, etc. GPS data may include, for example, timestamp, latitude, longitude, and elevation data. Sensor data may include actual physiological or contextual readings or estimates associated with various physical activities of the user, and such sensor data may be collected or determined in real time or on a regular basis. Examples of sensor data include heart rate, power, motion, movement, speed, range, acceleration data, etc. The GPS-enabled devices 210 may also be configured to collect the sensor data and display or transmit the sensor data. The term "activity data" as used herein refers to one or both of GPS data and sensor data.

In one embodiment, activity tracking system 200 may comprise a computing device (i.e., one or more computing devices), such as a server 230 (including a plurality of servers) configured to perform a plurality of functions embodied in various subsystems including, but not limited to, network site 231, data collector 233, graphing system 234 and graph encoding system 236. Those skilled in the art will appreciate that the example shown in FIG. 1 is non-limiting and that configuration of activity tracking system 200 may vary from implementation to implementation.

With continued reference to FIG. 1, the GPS data may be received and stored by GPS-enabled devices 210 during an activity by a user (e.g., walking, jogging, running, biking, etc.). This GPS data provides the geographic information of the recorded activity (e.g., latitude and longitude data). The user may optionally record other data, such as the user's heart rate or power, at a varied sample rate (e.g., 1-100 Hz or other rate) depending on the activity type, and any additional information (e.g., cadence, stride rate, etc.) as appropriate, depending on the particular GPS-enabled device that is used.

When an activity is completed by the user, the user instructs the device to send the recorded activity data over network 220 to the server 230. This can be sent directly if the device (such as a smartphone) has the capabilities. Otherwise, the device may be linked to a networked computer in order to deliver data. In other embodiments, the data may delivered real time or near real time using any of various networks.

The device 210 can provide this time series data for the activity, create a data file that is temporarily stored in memory, and send the data file. An example of activity data is provided in table 1, below. The activity data for the activity may include GPS data and sensor data (e.g., altitude data, acceleration data, heart rate data, or any of various other types of sensor data or other data).

TABLE 1

| timestamp | latitude | longitude | other (ex. heart rate) |
|---|---|---|---|
| 1.043567 | −97.3453452345 | 35.234523456 | 150 |
| 2.2345 | −97.3336362255 | 35.231213451 | 151 |
| 3.2345452 | −97.3336234534 | 35.193245234 | 150 |
| 4.234535 | −97.3434560120 | 35.225234623 | 150 |

According to one embodiment of the activity tracking system 200, activity data may be forwarded to the server 230 over the network 220 by a mobile application that may identify a user associated with the GPS data and an indicator that the activity data is associated with a workout, a type of activity (e.g., running, cycling, rowing or other activity). Network site 231 can provide a site accessible over a network such as the Internet or other network with an interface, such as an API, REST interface, thick client interface or other interface to allow GPS-enabled devices 210 or other client devices to interact with activity tracking system 200 to provide activity data and receive information.

Data collector 233 is configured to store the received activity data in a data store 240 as activity data 241. Furthermore, activity tracking system 200 may maintain profile data 242 for users, such as demographic information. Profile data 242 may include, by way of example but not limitation, age, gender, height, weight, preferences, performance level (e.g., beginner, intermediate, professional, etc.) or other information. Activity data 241 and profile data 242 may be stored such that GPS tracks (i.e., traversals of a particular street or path network defined by time-series GPS data) are associated with workouts (e.g., by unique work ids), users, dates and other information. Thus, data store 240 may store a large amount of activity data associated with users and workouts.

Constructing a Graph

With continued reference to FIG. 1, graphing system 234 is configured to construct a graph 244 from a set of coordinate data 243 (which may also be referred to herein as "map data"). According to one embodiment, map data 243 can be a set of latitude and longitude coordinates for streets with coordinates appearing at each intersection. For example, U.S. census publishes a database of latitude and longitude sequences for every street recorded, with nodes appearing at every intersection. (Topologically Integrated Geographic Encoding and Referencing files available from United States Census Bureau). Graphing system 234 can analyze the map data and build a network by assuming that overlapping streets with nodes within a very small value (such as a meter or other value) represent an intersection, and mark each of these nodes with a single unique value. Though this does not contain explicit directionality or connectivity between nodes (one-way streets, overpasses), this type of connectivity can be inferred from user behavior, as explained in further detail below. Alternatively, OpenStreetMap.org (www.OpenStreetMap.org) regularly publishes more complete datasets with explicit connectivity. Map data 243 may also include files from other sources.

The graphing system 234 is configured to construct a graph from map data 243 for any sized region as selected by an administrator. In some cases, separate graphs may be maintained for different regions of interests. For example, different cities may be represented in different graphs. In another embodiment, a single graph may be used for all regions.

Figure 2:
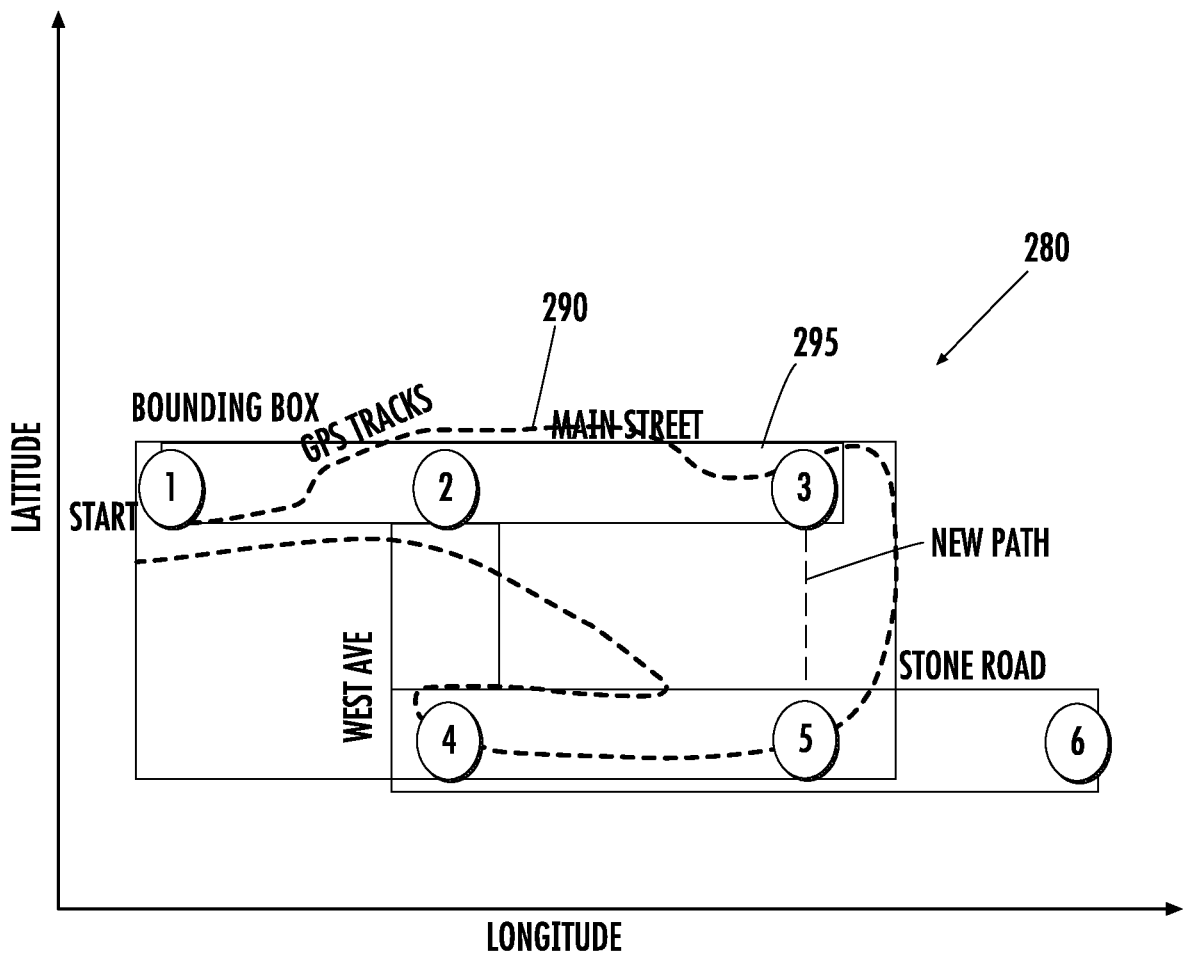
FIG. 2 is a diagram illustrating an exemplary GPS track of a user of the activity tracking system of FIG. 1, the GPS track mapped to a graph including a plurality of nodes.

A simplified example of a region with a street network 280 of interest for which a graph is to be created is illustrated by the street network of FIG. 2. As shown in FIG. 2, map data for a road system may include the following data for a simplified example:

Main Street: Lat=y1, Lon=x1; Lat=y1, Lon=x2; Lat=y1, Lon=x3;

Stone Road: Lat=y2, Lon=x2; Lat=y2, Lon=x3; Lat=y2, Lon=x4;

West Ave: Lat=y2, Lon=x2; Lat=y1, Lon=x2

Other information may also be included such as altitude, etc. The data can be mapped to a series of nodes and edges. The nodes are specific points on the map. The nodes are typically crossing points, but are not necessarily crossing points on the map. The edges are connecting paths or lines between the nodes.

In FIG. 2, the example street network can be described as a list of labeled nodes (labeled 1-6), the positions of those nodes (a latitude, longitude coordinate for each node), and list of edges extending between the nodes, with each edge represented as with an ordered pair of nodes:

G=(1,2), (2,3), (2,4), (4,5), (5,6)

where G is a graph describing the example street network of FIG. 2 (i.e., the nodes and connections that define the route segments along and between Main Street, West Ave., and Stone Road) as a list of ordered pairs of nodes. This list of ordered pairs assumes that graph G is undirected, so that ordered pairs (1,2) and (2,1) are redundant. However, some operations and/or metrics may use a directed graph (such as elevation). Transforming graph objects between directed and undirected states is understood by those of ordinary skill in the art.

Mapping GPS Data to Graph G

After the graph G is created, multiple GPS data time-series can be mapped onto the graph G to show potential routes that have been traversed over the represented street network. Each such route that has been traversed by a user is defined by a time-series of GPS data and is referred to herein as a "GPS track". A GPS track may represent a route taken by a user during a walk, run, biking workout, or other monitored traversal of the route. For every GPS data point for a GPS track 290, a network computing device (e.g., server 230) computes the nearest node, forming a list. To limit this search for computational efficiency, it may be preferable to only use nodes inside a bounding box 295 formed from the minimums and maximums of the longitude and latitude of track 290, respectively. For larger activities, it may be more computationally efficient to form a bounded polygon made up from a simplified GPS sequence. For simplification, Ramer Douglas Puekcer algorithm or other algorithm known or developed in the art may be used to form the bounding box. For forming the polygon from the points, the linestring.buffer function in the Shapely python library or other mechanism known or developed in the art may be used.

According to one embodiment, in order to map a GPS track to the graph G, a list or sequence of nodes of equal length to the number of GPS points is formed. Each node on the list represents the node on the graph G that the user 205 was closest to at the time the GPS coordinates were determined by the GPS-enabled device 210. For example consider a user moving from node 1 to node 2 of FIG. 2 wherein twenty GPS data points are collected as the user moves from node 1 to node 2. The earlier-in-time GPS data will show that the user is closest to node 1, and therefore each of these GPS data points (i.e., latitude and longitude coordinates) is associated with node 1. The later-in-time GPS data will show that the user is closest to node 2, and therefore each of these GPS data points is associated with node 2. At some point as the user moves in-between node 1 and node 2 a transition is made from the GPS data point being associated with node 1 to the GPS data point being associated with node 2. In the example where twenty GPS data points are collected between node 1 and node 2, a data point near the eleventh GPS data point may represent this transition from node 1 to node 2, assuming the user is moving at a constant pace. Accordingly, the list of GPS data points as the user moves from node 1 to node 2 in this example would be as follows: 11111111111122222222222.

When a user traverses across several nodes during a GPS track, the list of GPS nodes will be redundant because the closest node only occasionally changes within the typical GPS data collection interval (e.g., 1 second). These redundant nodes can be advantageously removed. In particular, a series of the same node can be reduced to a single instance. For example, if GPS track 290 in FIG. 2 renders the node list 11111122223333555554444445552222221111, the node list can be reduced to (1,2,3,5,4,5,2,1).

After preparing the sequence of nodes (1,2,3,5,4,5,2,1) as explained in the previous paragraph, the sequence of nodes can be transformed into to a list of edges (i.e., node pairs, each node pair representing a traversal from one node to the next. For example, the sequence of nodes (1,2,3,5,4,5,2,1) can be transformed into the following list of edges:
p=((1,2),(2,3),(3,5),(5,4),(4,5),(5,2),(2,1))
where p is the path (or list of edges) describing the activity of the user on GPS track 290. A path p created from a GPS track 290 may also be referred to herein as an "activity track".

Comparing the list of edges for GPS track 290 (i.e., (1,2),(2,3),(3,5),(5,4),(4,5),(5,2),(2,1)) to the graph G of FIG. 2 (i.e., G=(1,2), (2,3), (2,4), (4,5), (5,6)), it will be noted that two edges in path p do not exist in graph G. In particular, the graph G does not show the (3,5) edge or the (5,2) edge. The reason for this may be one of two reasons: (i) an error occurred with the GPS data, or (ii) there is a new path between the nodes that has yet to be defined in the graph G. For illustrative purposes, assume that edge (3,5) is a new trail that has not yet been encoded, and that edge (5,2) is due to GPS error. Methods for distinguishing these incongruences will be described in further detail below.

As noted previously, GPS data can be associated with a specific workout, user, and other information. Similarly, the path p for a GPS track may also be associated with a specific workout, user, or other information. In some cases, a path may represent an aggregation of GPS tracks for a user for a period, say a week or a year, or a single workout.

Constructing the Path Matrix and Suggestion Box

As noted previously, mapping of time-series GPS data for GPS track 290 onto the street network 280 of FIG. 2 produced a path two sets of data, including (i) the part of the path on graph G (which may be referred to herein as "identified" edges or connections), and (ii) parts of the path not on graph G that represent either potential new paths or GPS error (which may be referred to herein ad "unidentified" edges or connections). In order to determine whether the unidentified edges not on graph G represent either potential new paths or GPS error, the sequence of nodes for the GPS track 290 are stored in a "path matrix" 246 (which may also be referred to herein as "PM") and suggestions for new edges in the graph G are stored a "suggestion matrix" 248 (which may also be referred to herein as "suggestion box" or "SB"). As explained in further detail below, the path matrix 246 and the suggestion box 248 may be an undirected graph from which computations of aggregate activity data can also be performed. As also explained in further detail below, a number of queries can be answered using PM 246. A client computing device 250 can provide a set query criteria to 252 to the server 230 of activity tracking system 200, such as, what are the most popular routes (i.e., the most frequented routes) for users having certain demographics. Graph encoding system 236 can filter PM 246 based on the criteria. Edges that meet the criteria can be returned along with various metrics. In some cases, the edges can be mapped to visual representation of a map with color coding to visually identify particular edges meeting various criteria (e.g., a portion of a road corresponding to a most popular edge indicated in green, etc.)

The Path Matrix

An exemplary embodiment of a path matrix (PM) is shown in FIG. 3. The path matrix 246 in FIG. 3 is associated with the graph G, and includes information from the GPS track 290 of FIG. 2. The path matrix 246 is generally an m×n matrix where the m rows represent edges over a particular area of a graph, and n columns represent an activity track (for a certain day, a particular workout or other period). Accordingly, the rows are defined by edge 1 (1,2), edge 2 (2,3), edge 3 (2,4), edge 4, (4,5), and edge 5 (5,6). Again, these are the possible edges known to the system based on graph G. The columns are defined by some number of activity tracks. The example activity track discussed above (i.e., p=((1,2),(2,3),(3,5),(5,4),(4,5),(5,2),(2,1))) is represented as the first column in the PM 246 as shown in FIG. 3. The number of times one of the edges from the graph G was traversed during the activity track is represented in the associated row of the column. For example, for activity track 1 in the path matrix of FIG. 3 (i.e., p=((1,2),(2,3),(3,5),(5,4),(4,5),(5,2),(2,1))), edge 1 was traversed twice (i.e., p included (1,2) and (2,1)), edge 2 was traversed once (i.e., (2, 3)), edge 3 was not traversed, edge 4 was traversed twice (i.e., (1,2) and (2,1)), and edge 5 was not traversed. Note that both (1,2) and (2,1) in the path can be aggregated in a score of "2" since this edge (i.e., edge 4) was traversed twice in the same activity. In another embodiment, path matrix 246 may be applied to a directed graph such that there would be an entry for edge (1,2) and an entry for (2,1) in the first column. A number of additional activity tracks are also included in the path matrix, with one activity track represented in each column.

The Suggestion Box

An exemplary embodiment of a suggestion box (SB) is shown in FIG. 4. The suggestion box 248 generally includes a set of m×m sparse matrices, each one representing the 'suggestions' of a potential connection for graph G from an existing activity. Each sparse matrices includes an equal number of rows and columns (i.e., m×m), where the number is equal to the number of nodes in the graph. Therefore, for the graph G of FIG. 2 with six nodes, suggestion box 248 is a 6×6 matrix.

With continued reference to FIG. 4, suggestion box 248 includes two data entries, one for node combination (5,2) and another for node combination (3,5). These two node combinations represent both of the unknown edges (i.e., edges not currently included in the graph G) from the GPS track 290 of FIG. 2. Accordingly, each of these unknown edges is a "suggestion" in the suggestion box 248. Suggestion (5, 2) is represented by a "1", and suggestion (3, 5) is also represented by a "1" in the suggestion box 248 of FIG. 4. These "suggestions" are in the suggestion box 248 are for additional edges that could be added to the graph G, based on data collected from activity track 1. Additional data entries may be made to the suggestion box 248 based on other activity tracks (e.g., activity tracks 2 and 3 in the path matrix 246).

Since the path matrix 246 is, in some embodiments, an undirected graph, the matrices with suggestion box 248 can be sparse, and, by convention, upper triangular. This means that all suggested edges can be encoded with an increasing row-column format.

Operations on the Path Matrix

Mathematical operations may be performed on the PM in order to determine at least one property for the graph G. Quick sparse computations can be performed to create a variety of aggregate information. There are many combinations of operations that can be performed, including, but not limited to, the exemplary operations discussed in the following paragraphs, with reference to FIG. 5.

A summary of all activity within the graph G can be obtained by the inner product PM*v, where v is a vector where each element is one (i.e., vector v is a v×1 matrix). The vector v is of length n, which is equal to the number of activity paths in the path matrix 246 (i.e., the number of columns in PM 246). Accordingly, because v=n the PM may be multiplied by the vector v. This operation of linear algebra produces a sum across all columns, producing a vector of length m (number of edges). This operation may be used to obtain summary information from the path matrix on only a subset of activities. In particular, the operation can be performed with a vector where only the elements representing the desired activities have a "1".

Figure 5:
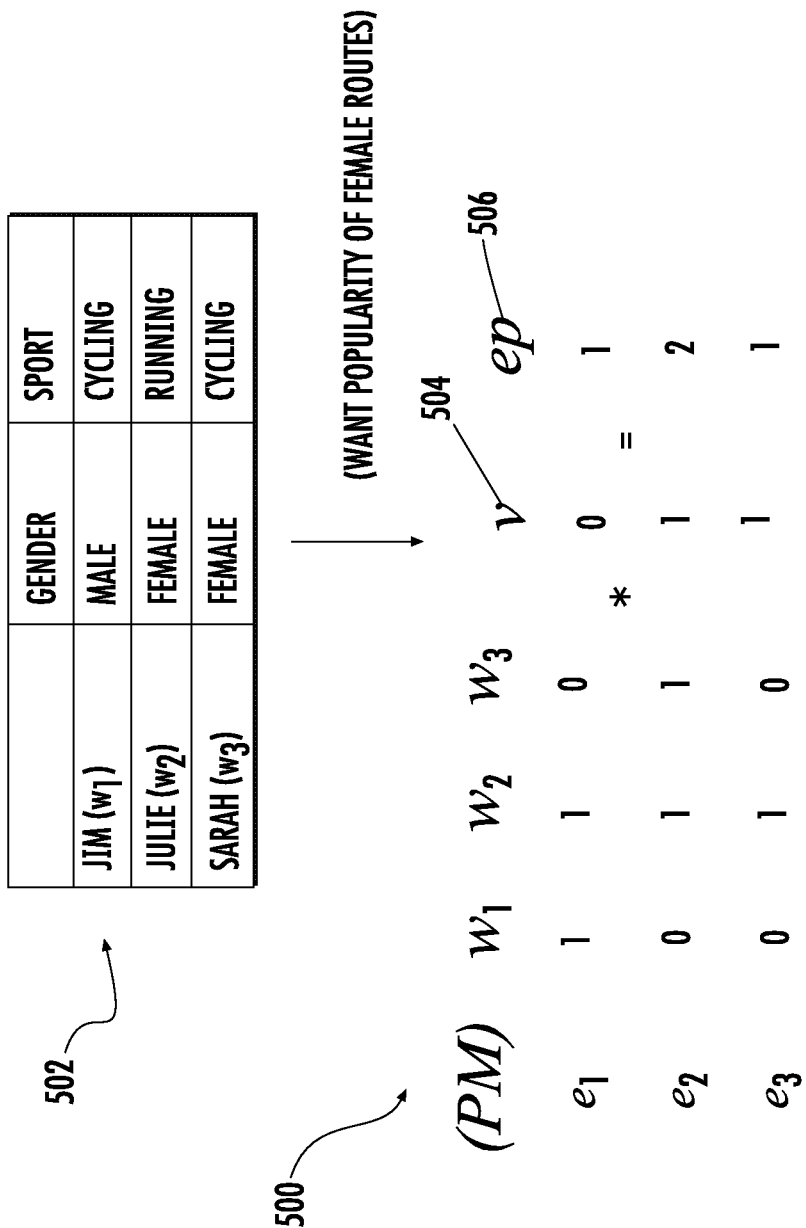
FIG. 5 illustrates an exemplary embodiment of an operation performed on the path matrix of FIG. 3 to render an edge property vector.

By multiply the PM (m×n matrix) by a vector v, custom edges properties may be created, representing aggregate data of any of various types. To illustrate an example, consider the path matrix (PM) 500 in FIG. 5 created by applying three paths to a graph, each path corresponding to a different workout. PM 500 has 3 edges (i.e., $e_1$, $e_2$, and $e_3$, which are node combinations) and 3 workouts ($w_1$, $w_2$, and $w_3$, which are three activity tracks). Each workout was performed by one of three different people having profile data 502. To determine the edge that is most popular with women, we multiply the PM 500 by the vector 504 (i.e., vector (0,1,1)). The first row of vector 504 is negative and therefore a "0" because, as shown in profile data 502, the person who performed workout $w_1$ is a male; rows two and three of vector 504 are positive and therefore a "1" because workouts $w_2$ and $w_3$ were performed by females. When PM 500 is multiplied by vector 504, the result is another vector of edge properties 506 (i.e., ep=(1,2,1)) as shown in FIG. 5. The highest value of vector 506 is found in row two, making the second edge $e_2$ the most popular edge.

Based on the foregoing example, it can be seen that creating a vector 504 based on information in the profile data, and then multiplying the path matrix 500 by that vector, results in a vector with edge properties that is capable of identifying most used and least used edges by the demographic represented by the user profile vector 504. As another example, if one wanted to find the relative popularity of the edges with only cyclists, PM 500 of FIG. 5 could be multiplied by vector (1,0,1) (which represents the cycling workouts in the example of FIG. 5).

In addition to determining most and least popular edges for a group of activity tracks, the multiplication operation on the path matrix may also be used to provide summary information about which activity tracks utilized a particular edge or group of edges. In particular, summary information about a particular edge, or group of edges can be obtained by the operation PM×v where v is a vector of length n made up of 1 s for the desired edges. For example, to find all the workouts of $e_2$ in FIG. 5, multiply PM by (0,1,0), which would give the vector ep (0,1,1). This vector ep (0,1,1) shows that only the 2nd and 3rd workout traversed edge $e_2$.

Combinations of the above operations using various vectors, along with a database of activities with useful attributes, can lead to a large variety of useful information, such as age and gender profile for particular streets, graphs of when particular members activities overlap, etc.

Growing Graph G from the SB

As discussed previously, the suggestion box contains suggestions for additional edges (i.e., unidentified edges) for graph G from each activity track in the set (i.e., in the path matrix). One embodiment of growing graph G from these suggestions can include the steps described below.

A first step for growing graph G is to sum the sparse matrices of the suggestion box. Most sparse matrix libraries allow this operation to be performed directly, producing a single sparse matrix with each element representing the total suggestions for a particular edge over all activities on graph G. In other words, if multiple suggestion boxes exist for a given graph G, the summation of all the suggestion boxes for the graph G will provide a total number of suggestions for each edge.

After the suggestion boxes are summed for a particular graph G, a threshold value may be used to determine which values in the suggestion box represent GPS error, and which values in the suggestion box represent legitimate trails that should be added to the graph G. In particular if a value in the suggestion box is below the threshold value, it can be assumed that this suggestion is invalid and the result of GPS error, or alternatively, the trail offered by the suggestion is not sufficiently well-used to be included on in the graph G. On the other hand, if the value in the suggestion box is above the threshold value, it can be assumed that this suggestion is valid and represents a new trail which should be represented by an edge on the graph G.

In at least one embodiment, a simple threshold value can be approximated by some lower percentile (e.g., a value in the lower 5% to 15%, such as 10%) of frequency of edge traverses from the existing edges in G. For example, if an edge in a particular path matrix has a value of "5", and this value places the edge in the bottom ten percent of all values in the path matrix, a value of "5" may be a good threshold value. Alternatively, in another embodiment, past experience with other suggestion boxes may indicate that a threshold value of "7" is a good threshold value. As noted previously, suggested edges that are above the threshold, can be added as rows in the path matrix and graph G. Retroactively, is can be added to the columns of the path matrix for the activities that produced the suggestions in the SB. For example, if edge (3,5) is added to the PM of FIG. 3, a count can be added to the PM for activity track 1, which was derived from GPS track 290 of FIG. 2.

The method described above is useful in developing additional edges for graphs. Various additional processing may be performed on the data to ensure that the additional edges are accurate and useful. For example, in some embodiments, an edge will only be added if the nodes are separated by a relatively short distance (say, less than 200 meters or other configurable distance). Additionally, some embodiments can verify that the time taken to traverse each node is relatively consistent (e.g., within a configurable threshold deviation) before the edge is added.

In some embodiments, additional values (heart rate, speed, elapsed time) can be encoded for nodes in the user's path. According to one embodiment, the value for a parameter corresponding to the nearest GPS point in an activity track that is mapped to a node can be recorded. For example, for the sequence (1,2,3,5,4,5,2,1) discussed above, there may have been 100 GPS points in track 290 that map to node 3. Picking the timestamp of the closest GPS point gives the time that the user was closest to the node. Similarly, the heart rate measurement taken closest to a node or timestamp could also be encoded for the sequence. In another embodiment, the values of a parameter corresponding to multiple GPS points can be averaged or otherwise considered. Using the example above, if there are 100 GPS points that map to node 3, then 2-100 corresponding heart rate values can be averaged for node 3.

For values that are cumulative (such as number of steps) it may be desirable to perform the same operation and then compute the difference between the current and previous node to get an elapsed value for an edge (e.g., number of steps to traverse an edge).

One feature of cumulative data, such as timestamps, is that recording such data implicitly encodes the order of the edges. Since the timestamps are monotonically increasing, the next edge can be determined by finding the next larger timestamp.

Cumulative data may be encoded in a directed graph form. Runners and cyclists often traverse the same street from different directions (such as leaving and returning to their house). A directed graph will allow these numbers to be distinct. For example, in the path p=((1,2),(2,3),(3,5),(5,4),(4,5),(5,2),(2,1)), suppose it took the person (6,7,8,9,6,7,7,6) seconds for each of the edges in the path, respectively. A directed graph would require a PM with twice the number of rows of PM 246 of FIG. 3. To make cumulative timestamps, the sequence (6,13,21,30,36,43,50,56) can be calculated. The values for (3,5) and (5,2) can similarly be put into the suggestion box. If (3,5) passes the threshold to be included within graph G, then the associated timestamp can also be inserted.

Loops in Paths

Figure 6:
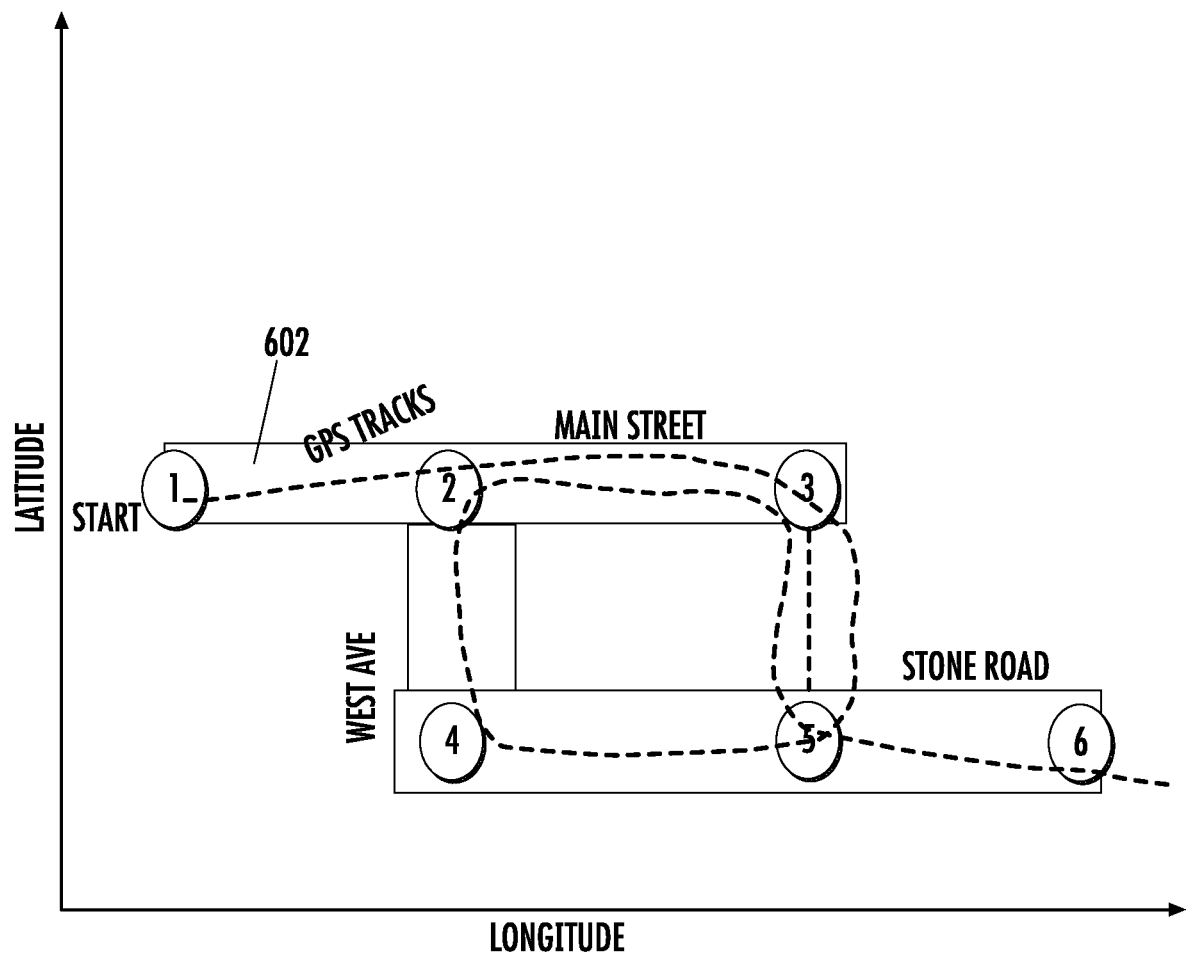
FIG. 6 illustrates another exemplary embodiment of a GPS track of a user of the activity tracking system of FIG. 1, the GPS track mapped to a graph including a plurality of nodes.

FIG. 6 is a diagrammatic representation of a GPS track 602 in which the user made a loop. As discussed previously, the path for the GPS track can be represented as an activity track defined as p=((1,2),(2,3),(3,5),(5,4),(4,2),(2,3),(3,5),(5,6)). As shown in FIG. 6, the loop in the activity track occurred along edges (2,3), (3,5), (5,4), (4,2), (2,3) and (3,5). In some embodiments, it may be desirable to separately record the case of multiple loops over a sequence of edges during a single activity. In some cases, the user may indicate that they made one or more loops (e.g., by interfacing with his or her mobile device to mark the start of a new loop during a fitness activity or otherwise). In other cases, loops may be detected based on repeating sequences of nodes.

Figure 7:
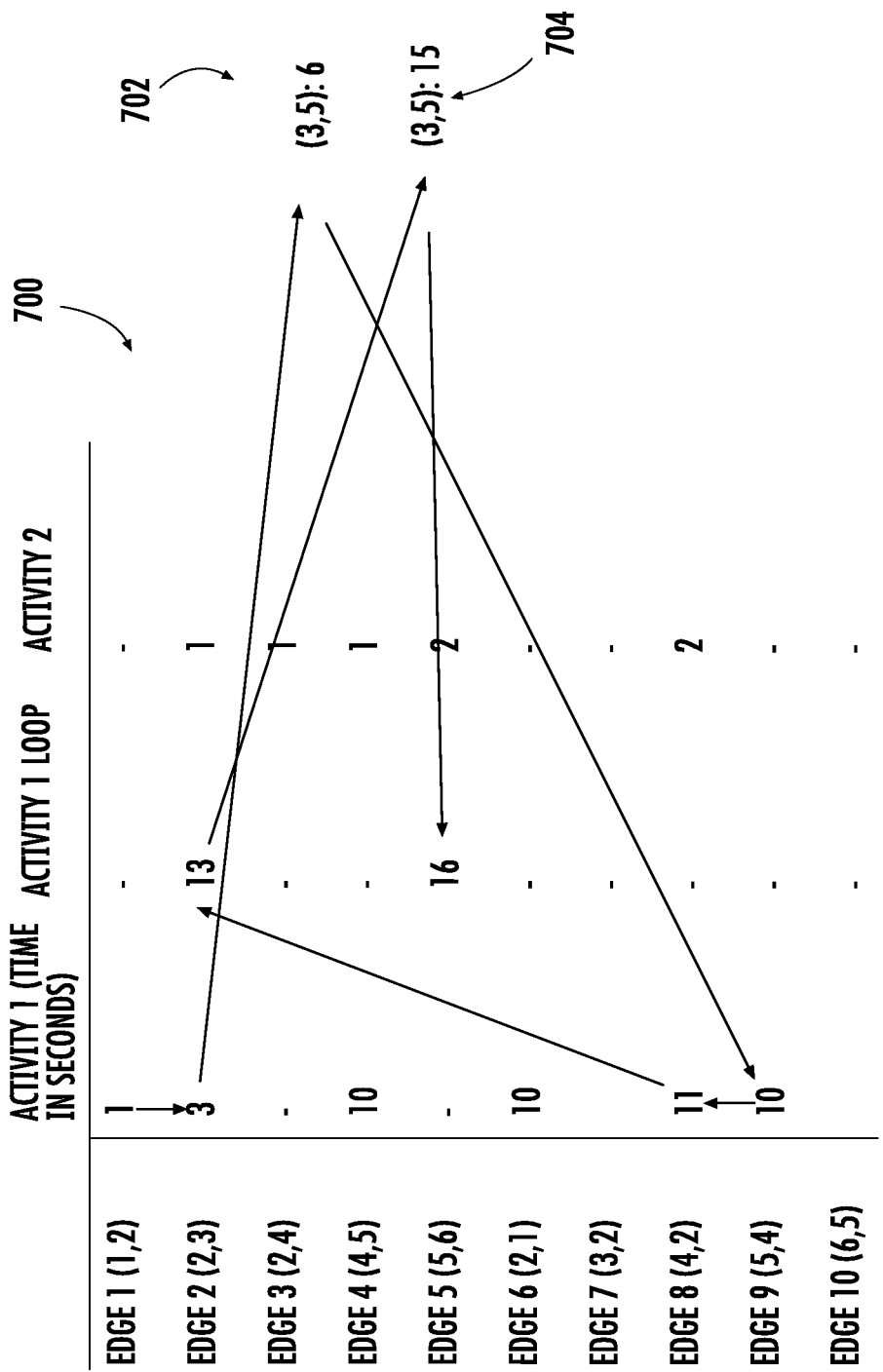
FIG. 7 illustrates another exemplary embodiment of a path matrix using the nodes of the graph of FIG. 6 and a number of activity tracks.

FIG. 7 is a diagrammatic representation of one embodiment of a PM 700 including entries for GPS track 602. In the embodiment FIG. 7, PM 700 is encoded with elapsed time to cross each edge. A column can be added for each loop. In this example, PM 700 includes two columns for GPS track 602. Additional suggestion box entries can also be created (e.g., as represented by 702 for the first cycle and 704 for the second cycle). In this example, each loop is essentially treated as a separate workout. An additional index can be added for the same workout for each loop.

Method of Expanding and Determining Properties of Graph

Figure 8:
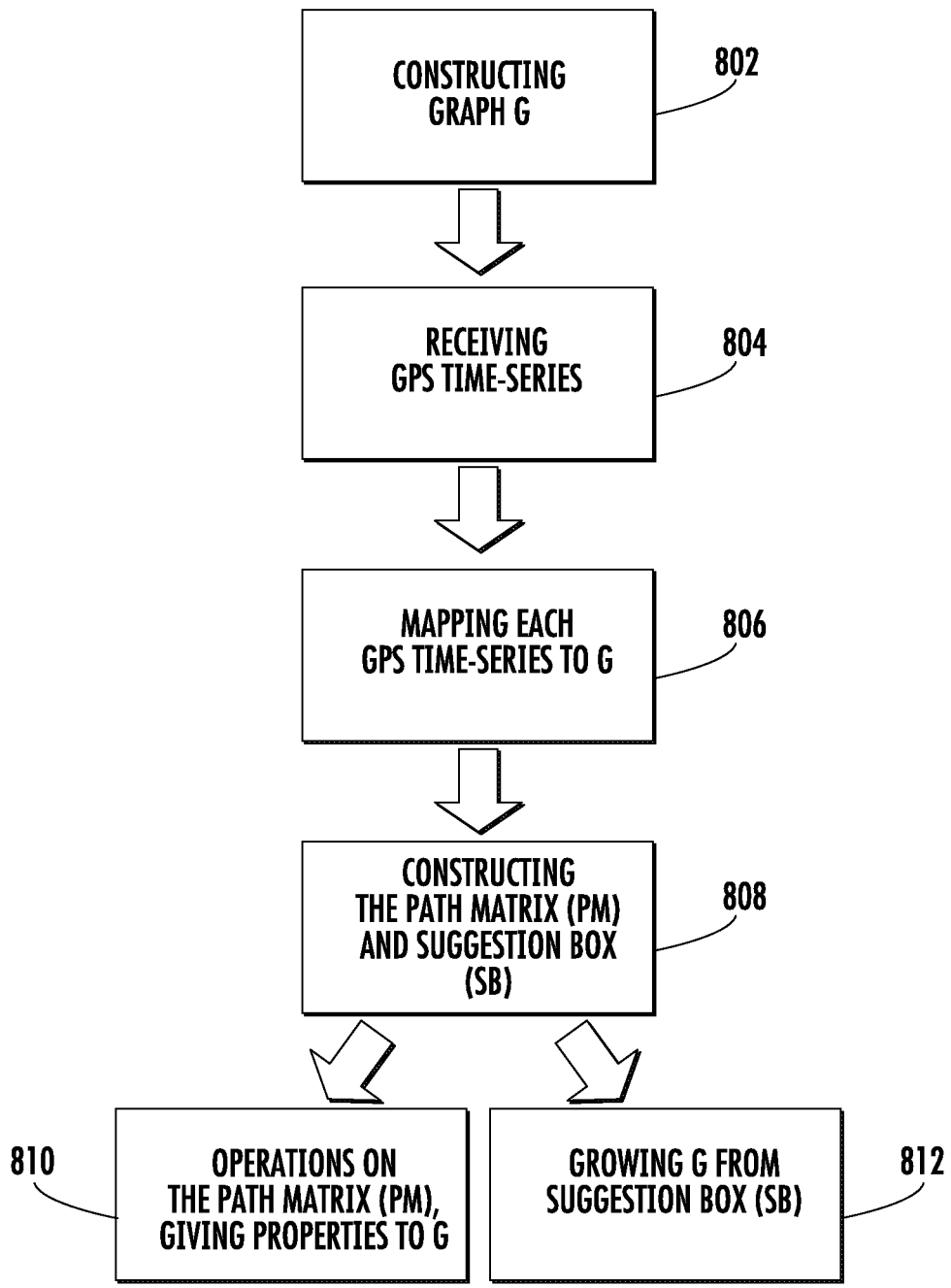
FIG. 8 is a flow chart of one embodiment of a process of deriving additional graph activity data from the path matrix and the suggestion box.

FIG. 8 is a flow chart illustrating one embodiment of a method of expanding a graph and determining properties for the graph, such as determining fitness data associated with the graph. As shown in FIG. 8, the method begins with step 802, wherein a graph G is constructed using data from various GPS tracks. The graph G may be constructed in the manner described above using graphing system 234 which is configured to construct the graph 244 in a database from a set of coordinate data 243. As described above, the graph includes by a plurality of nodes and a plurality of connections between the nodes. An exemplary graph is graph G=(1,2), (2,3), (2,4), (4,5), (5,6), which represents the street network 280 of FIG. 2.

After the graph is constructed, the method continues with step 804 wherein GPS data points are received for a GPS track associated with the graph. The GPS data points may be transmitted from a GPS-enabled device (e.g., device 201 of FIG. 2) as a user traverses a route, and received in real time at a network computing device (e.g., server 230 of FIG. 2). Alternatively, the GPS data points may recorded by the GPS-enabled device and uploaded to the network computing device after the user traverses the route. In at least one embodiment, the GPS data points are associated with additional information such as timestamps and fitness information (e.g., heart rate, etc.) associated with the user along the GPS track.

After the GPS data points for the GPS track are received by the network computing device (e.g., server 230), the method continues with step 806 wherein GPS data points are mapped to the graph. This mapping process includes determining an activity track based on the GPS track, the activity track including a plurality of nodes from the graph and at least one edge between the nodes. An exemplary activity track was described previously as the following list of edges: p=((1,2),(2,3),(3,5),(5,4),(4,5),(5,2),(2,1)).

Next, the method continues with step 808 and the network computing device constructs a path matrix (e.g., PM 246 of FIG. 3) and a suggestion box (e.g., SB 248 of FIG. 4). The path matrix includes a plurality of values, and each value of the path matrix is associated with (i) one of the plurality of edges between nodes of the graph (e.g., edges 1-5 of FIG. 3) and (ii) one of a plurality of activity tracks (e.g., activities 1-3 of FIG. 3). Any edges from an activity track that are not associated with one of the plurality of edges of the graph are "unidentified" edges which are placed in the suggestion box. As discussed previously, the suggestion box may include a matrix identifying each of the possible connections in the graph and providing a value for any unidentified edges that occur in one or more of the activity tracks.

The path matrix and the suggestion box may be used to determine properties of the graph by performing operations on the graph, as noted in step 810 of FIG. 8, and may also be used to expand the graph based on the unidentified edges, as noted in step 812 of FIG. 8. With reference to step 810, a mathematical operation may be performed on the path matrix in order to determine at least one property for the graph. For example, as described above with reference to FIG. 5, if the path matrix is multiplied by a first vector derived from a user profile database, a second vector will result that provides information on the most popular routes for the user demographic defined by the first vector.

As noted previously in step 808, the suggestion box includes unidentified edges that were determined from one or more activity tracks. In step 812, a determination is made whether the unidentified connection should be included in the graph. In at least one embodiment as discussed above, this determination may be based on a comparison of the value in the suggestion box to a threshold value. If it is determined that the unidentified connection should be included as a connection in the graph, the graph is expanded, grown or otherwise amended to include the unidentified connection.

Network Computing Environment

Figure 9:
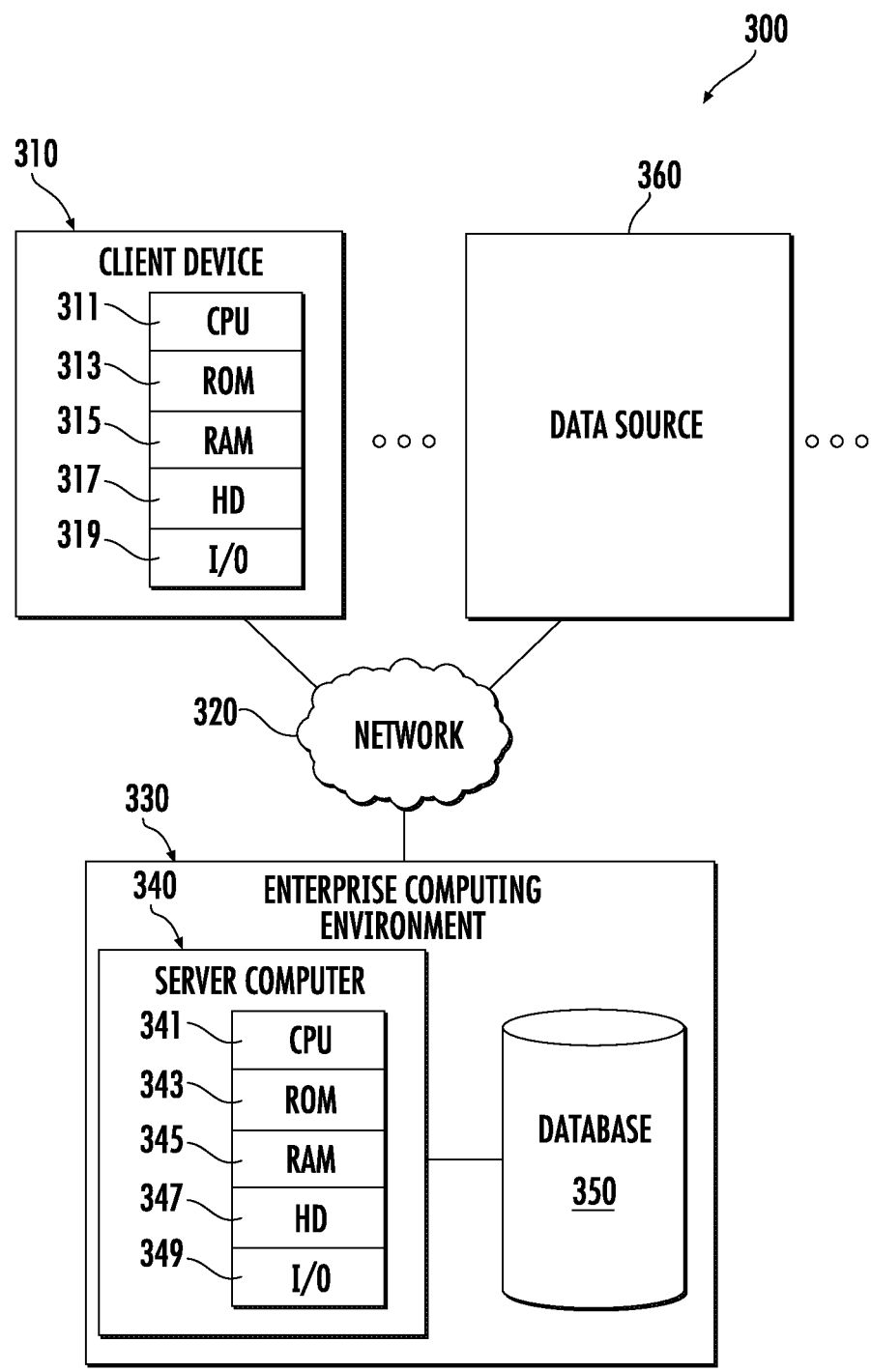
FIG. 9 illustrates an exemplary embodiment of a client device and enterprise computing environment for the activity tracking system of FIG. 1.

FIG. 9 is a diagrammatic representation of one embodiment of a network computing environment 300 that may be used to implement the activity tracking system 200. For purposes of clarity, a single client computer, a single server computer, and a single data source are shown in the figure. The client and server computers and data source represent an exemplary hardware configuration of data processing systems that are capable of bi-directionally communicating with each other over a public network such as the Internet. Those skilled in the art will appreciate that network computing environment 300 may comprise multiple server computers, and multiple client computers and data sources may be bi-directionally coupled to enterprise computing environment 330 over network 320.

Client computer 310 is a GPS-enabled device, such as GPS-enabled device 210 described previously with reference to FIG. 1. The client computer 310 can include central processing unit ("CPU") 311, read-only memory ("ROM") 313, random access memory ("RAM") 315, ("HD") or storage memory 317, and input/output device(s) ("I/O") 319. I/O 319 can include a keyboard, monitor, printer, and/or electronic pointing device. Example of I/O 319 may include mouse, trackball, stylist, or the like. Client computer 310 can include a cellular phone, a smart phone, a GPS phone, or any device capable of geotagging and communicating over a network.

Server computer 340 may have similar hardware components including CPU 341, ROM 343, RAM 345, hard drive 347, and I/O 349. Data source 360 may be a server computer having hardware components similar to those of client computer 310 and server computer 340, or it may be a data storage device. Server computer 340 may provide one embodiment of an activity tracking system.

Each computer 310 and 340 shown in FIG. 9 is an example of a data processing system. ROM 313 and 343, RAM 315 and 345, storage memory 317 and 347, and database 350 can include media that can be read by CPU 311 and/or 341. Therefore, these types of computer memories include computer-readable storage media. These memories may be internal or external to computers 310 and/or 340.

Portions of the methods described herein may be implemented in suitable software code that may reside within ROM 343, RAM 345, hard drive 347, database 350, data source 360 or a combination thereof. In some embodiments, computer instructions implementing an embodiment disclosed herein may be stored on a direct access storage device (DASD) array, magnetic tape, floppy diskette, optical storage device, or other appropriate computer-readable storage medium or storage device. A computer program product implementing an embodiment disclosed herein may therefore comprise one or more computer-readable storage media storing computer instructions translatable by CPU 341 to perform an embodiment of a method disclosed herein.

In an illustrative embodiment, the computer instructions may be lines of compiled C++, Java, or other language code. Other architectures may be used. For example, the functions of server computer 340 may be distributed and performed by multiple computers in enterprise computing environment 330 or in a cloud in network computing environment 300. Accordingly, each of the computer-readable storage media storing computer instructions implementing an embodiment disclosed herein may reside on or accessible by one or more computers in enterprise computing environment 330 or in a cloud in network computing environment 300.

Routines, methods, steps, operations or portions thereof described herein can be implemented through control logic, including computer executable instructions stored on a computer readable medium, hardware, firmware or a combination thereof. The control logic can be adapted to direct an information processing device to perform a set of steps disclosed in the various embodiments. Some embodiments may be implemented by using software programming or code in one or more digital computers, by using application specific integrated circuits, programmable logic devices, field programmable gate arrays, optical, chemical, biological, quantum or nanoengineered systems, components and mechanisms. Based on the disclosure and teachings provided herein, a person of ordinary skill in the art will appreciate other ways and/or methods to implement the invention.

Computer executable instructions or code can be stored in a computer-readable medium and can be operated on by a processor to permit a computer to perform functions, steps, operations, methods, routines, operations or portions thereof described herein. Any suitable language can be used including C, C++, Java, JavaScript, assembly language or other programming or scripting code. Different programming techniques can be employed such as procedural or object oriented. In an embodiment, HTML may utilize JavaScript to provide a means of automation and calculation through coding.

Any particular step, operation, method, routine, operation or portion thereof can execute on a single computer processing device or multiple computer processing devices, a single computer processor or multiple computer processors. Data may be stored in a single storage medium or distributed through multiple storage mediums, and may reside in a single database or multiple databases (or other data storage). The sequence of operations described herein can be interrupted, suspended, or otherwise controlled by another process, such as an operating system, kernel, etc. The routines can operate in an operating system environment or as stand-alone routines.

A "computer-readable medium" may be any type of data storage medium that can store computer instructions, including, but not limited to read-only memory (ROM), random access memory (RAM), hard disks (HD), data cartridges, data backup magnetic tapes, floppy diskettes, flash memory, optical data storage, CD-ROMs, or the like. The computer readable medium can be, by way of example, only but not by limitation, an electronic, magnetic, optical, electromagnetic, infrared, or semiconductor system, apparatus, system, device, or computer memory. The computer readable medium may include multiple computer readable media storing computer executable instructions, such as in a distributed system or instructions stored across an array.

A "processor" includes any hardware system, hardware mechanism or hardware component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will be understood for purposes of this disclosure that a service or module is one or more computer devices, configured (e.g., by a computer process or hardware) to perform one or more functions. A service may present one or more interfaces which can be utilized to access these functions. Such interfaces include APIs, interfaces presented for a web services, web pages, remote procedure calls, remote method invocation, etc.

Embodiments can be implemented in a computer communicatively coupled to a network (for example, the Internet, an intranet, an internet, a WAN, a LAN, a SAN, etc.), another computer, or in a standalone computer. As is known to those skilled in the art, the computer can include a central processing unit ("CPU") or processor, memory (e.g., primary or secondary memory such as RAM, ROM, HD or other computer readable medium for the persistent or temporary storage of instructions and data) and one or more input/output ("I/O") device(s). The I/O devices can include a keyboard, monitor, printer, electronic pointing device (for example, mouse, trackball, stylus, etc.), touch screen or the like. In embodiments, the computer has access to at least one database on the same hardware or over the network.

Steps, operations, methods, routines or portions thereof of the present invention may be implemented on one computer or shared among two or more computers. In one embodiment, the functions of the present invention may be distributed in the network. Communications between computers implementing embodiments of the invention can be accomplished using any electronic, optical, radio frequency signals, or other suitable methods and tools of communication in compliance with network and other communications protocols.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Further, unless expressly stated to the contrary, "or" refers to an inclusive or and not to an exclusive or. That is, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present).

As used herein, a term preceded by "a" or "an" (and "the" when antecedent basis is "a" or "an") includes both singular and plural of such term unless the context clearly dictates otherwise. Also, as used in the description herein, the meaning of "in" includes "in" and "on" unless the context clearly dictates otherwise.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

In the foregoing specification, the invention has been described with reference to specific embodiments. However, one of ordinary skill in the art appreciates that various modifications and changes can be made without departing from the scope of the invention. Accordingly, the specification, including the Summary and Abstract, and figures are to be regarded in an illustrative rather than a restrictive sense, and all such modifications are intended to be included within the scope of invention.

What is claimed is:

1. A method for identifying an edge of a graph associated with selected demographic data from a user database, the method comprising:
   defining the graph within a bounded polygon, the graph including a plurality of nodes and a plurality of connections between the nodes;
   receiving global positioning system (GPS) data points for a plurality of GPS tracks from a plurality of GPS-enabled devices;
   mapping the GPS data points for each of the plurality of the GPS tracks to the graph by determining an activity track based on the GPS track, the activity track including a plurality of nodes from the graph and at least one connection between the nodes;
   creating a path matrix including a plurality of values, each value in the path matrix associated with (i) one of the plurality of connections between nodes of the graph and (ii) one of the determined activity tracks;
   defining a user profile vector based at least in part on the selected demographic data in the user database;
   multiplying the path matrix and the user profile vector to obtain a resulting vector; and
   determining at least one edge of the graph associated with selected demographic based on the resulting vector.

2. The method of claim 1 wherein the resulting vector includes properties indicative of frequency of traversal of each of the plurality of connections of the graph in association with the selected demographic data.

3. The method of claim 2 wherein each of the activity tracks is associated with user profile data in the user database, and wherein the user profile vector is defined based on the user profile data.

4. The method of claim 3 wherein the user profile data includes user gender and type of activity.

5. The method of claim 1 wherein defining the graph within the bounded polygon includes forming a bounding box based at least in part on a maximum and a minimum of a longitude and a latitude of the GPS data points for at least one GPS track.

6. The method of claim 1 wherein defining the graph within the bounded polygon includes determining a simplified GPS sequence and forming the bounded polygon based on the simplified GPS sequence.

7. The method of claim 1 wherein receiving GPS data points for the plurality of GPS tracks occurs prior to defining the graph within the bounded polygon.

8. A non-transitory computer readable medium containing instructions for identifying an edge of a graph associated with selected demographic data from a user database by:
   defining the graph within a bounded polygon, the graph including a plurality of nodes and a plurality of connections between the nodes;
   receiving global positioning system (GPS) data points for a plurality of GPS tracks from a plurality of GPS-enabled devices;
   mapping the GPS data points for each of the plurality of the GPS tracks to the graph by determining an activity track based on the GPS track, the activity track including a plurality of nodes from the graph and at least one connection between the nodes;
   creating a path matrix including a plurality of values, each value in the path matrix associated with (i) one of the plurality of connections between nodes of the graph and (ii) one of the determined activity tracks;
   defining a user profile vector based at least in part on the selected demographic data in the user database;
   multiplying the path matrix and the user profile vector to obtain a resulting vector; and
   determining at least one edge of the graph associated with selected demographic based on the resulting vector.

9. The computer readable medium of claim 7 wherein the resulting vector includes properties indicative of frequency of traversal of each of the plurality of connections of the graph in association with the selected demographic data.

10. The computer readable medium of claim 8 wherein each of the activity tracks is associated with user profile data in the user database, and wherein the user profile vector is defined based on the user profile data.

11. The computer readable medium of claim 9 wherein the user profile data includes user gender and type of activity.

12. The computer readable medium of claim 7 wherein defining the graph within the bounded polygon includes defining a bounding box based at least in part on a maximum and a minimum of a longitude and a latitude of the GPS data points for at least one GPS track.

13. The computer readable medium of claim 7 wherein receiving GPS data points for the plurality of GPS tracks occurs prior to defining the graph within the bounded polygon.

14. A method for determining properties associated with a graph, the graph including a plurality of nodes and a plurality of connections between the nodes, the method comprising:
   receiving global positioning system (GPS) data points for a plurality of GPS tracks associated with the graph;
   mapping the GPS data points for each of the plurality of the GPS tracks to the graph by determining an activity track based on the GPS track, the activity track including a plurality of nodes from the graph and at least one connection between the nodes; and
   creating a path matrix including a plurality of values, each value in the path matrix associated with (i) one of the plurality of connections between nodes of the graph and (ii) one of the determined activity tracks;

performing a mathematical operation on the path matrix in order to determine at least one property for the graph, the mathematical operation including multiplying the path matrix by a first vector to provide a second vector, the second vector having properties indicative of frequency of traversal of the plurality of connections of the graph.

15. The method of claim 14 wherein each of the activity tracks is associated with profile data, and wherein the first vector is derived based on the profile data.

16. The method of claim 15 wherein the profile data includes user gender and type of activity.

17. The method of claim 14 wherein the at least one property associated with the graph is indicative of (i) a frequency of traversal of the plurality of connections of the graph for a selected demographic of users or (ii) activity tracks that utilized a particular connection between the nodes of the graph.

18. The method of claim 14 wherein the graph is bounded within a bounding box that includes the plurality of nodes.

* * * * *